(12) United States Patent
Peleg

(10) Patent No.: US 7,712,383 B2
(45) Date of Patent: May 11, 2010

(54) LIQUID SUPPLY MEASURING APPARATUS

(75) Inventor: Dani Peleg, Kiryat Tivon (IL)

(73) Assignee: AP2U.Net Ltd., Herzlia (IL)

( * ) Notice: Subject to any disclaimer, the term of this patent is extended or adjusted under 35 U.S.C. 154(b) by 395 days.

(21) Appl. No.: 11/658,689

(22) PCT Filed: Jul. 21, 2005

(86) PCT No.: PCT/IL2005/000774

§ 371 (c)(1),
(2), (4) Date: Jan. 25, 2007

(87) PCT Pub. No.: WO2006/011134

PCT Pub. Date: Feb. 2, 2006

(65) Prior Publication Data

US 2008/0307897 A1    Dec. 18, 2008

(30) Foreign Application Priority Data

Jul. 26, 2004    (IL)    ................................. 163208

(51) Int. Cl.
*G01F 1/05*    (2006.01)
(52) U.S. Cl. .................................................. 73/861.79
(58) Field of Classification Search ............. 73/861.77, 73/253, 861.52, 861.84, 861.89
See application file for complete search history.

(56) References Cited

U.S. PATENT DOCUMENTS

| | | | |
|---|---|---|---|
| 4,140,013 A | 2/1979 | Hunger | .................... 73/861.77 |
| 5,027,653 A | 7/1991 | Foran, Jr. | ...................... 73/253 |
| 6,106,705 A * | 8/2000 | Giordano et al. | .............. 210/87 |
| 6,619,138 B2 * | 9/2003 | Kettle et al. | .............. 73/861.52 |
| 6,854,342 B2 * | 2/2005 | Payne et al. | .............. 73/861.79 |
| 6,926,821 B2 * | 8/2005 | Giordano et al. | .............. 210/87 |
| 7,111,520 B2 * | 9/2006 | Payne et al. | .............. 73/861.79 |

* cited by examiner

*Primary Examiner*—Jewel Thompson
(74) *Attorney, Agent, or Firm*—Ladas & Parry, LLP

(57) ABSTRACT

A liquid supply measuring apparatus is disclosed. The provided apparatus is comprised of a housing to be serially installed to a liquid passage in a way that the supplying liquid passes through the housing; a turbine, the turbine is installed inside the housing, wherein the turbine is spin by the passing liquid; a generator, the generator is pivotally or geared joined to the turbine and supplies electrical power according to the turbine's spin; and a controller, capable to calculate the supplied liquid in a way of integrating the supplied electrical power in a time sequence. According to a preferred embodiment the liquid supply measuring apparatus is provided, wherein the housing is separated into a first and second liquid passage and having a large turbine for high flow liquid and small turbine for low flow liquid—both are connected to generators—wherein the large turbine is located in the first passage and the small turbine is located in the second passage and wherein the first passage has a valve that enables or disables liquid to pass through the passage according to a predetermined criteria and wherein the criteria can be, inter alia, pressure differences or a command from the controller. By another preferred embodiment of the present invention it is provided the liquid supply measuring apparatus, wherein the valve is closed in a low flow of liquid through the apparatus, and is opened when the flow is rising over a predetermined threshold.

6 Claims, 3 Drawing Sheets

LIQUID SUPPLY MEASURING APPARATUS

CROSS-REFERENCE TO RELATED APPLICATIONS

This application is the U.S. National Stage of International Patent Application No. PCT/IL2005/000774, filed on Jul. 21, 2005, which claims priority to Israeli Patent Application No. 163,208, filed on Jul. 26, 2004, the disclosure of which is hereby incorporated by reference in its entirety.

FIELD OF THE INVENTION

The present invention relates to a liquid supply measuring apparatus that enables to measure quantities of supplied water and controlling gardens irrigation. The present invention is useful for irrigation systems.

BACKGROUND OF THE INVENTION

The known means for measuring liquid supply—e.g., water, oil etc.—is a mechanical apparatus since the electronic existing apparatus is inaccurate. Therefore, irrigation systems are usually based on time of supplying water instead of quantities of water. The main disadvantage of this method is being inaccurate. The quantity of supplied water during the time sequence depends on the pressure of the supplied water and moreover in case of a broken pipe much water can be wasted since the quantity of water dose not control. The present invention provides an accurate liquid supply measuring apparatus, based on electrical method that is capable to supply its own electrical consumption.

SUMMARY OF THE INVENTION

The present invention is a liquid supply measuring apparatus.

According to the teaching of the present invention there is provided a liquid supply measuring apparatus comprised of:
- a housing to be serially installed to a liquid passage in a way that the supplying liquid passes through the housing;
- a turbine, the turbine is installed inside the housing, wherein the turbine is spin by the passing liquid;
- a generator, the generator is pivotally or geared joined to the turbine and supplies electrical power according to the turbine's spin; and
- a controller, capable to calculate the supplied liquid in a way of integrating the supplied electrical power in a time sequence.

By a preferred embodiment of the present invention it is provided the liquid supply measuring apparatus, wherein the generator is geared by two cogwheels, first cogwheels on the generator axis and second cogwheel on the turbine axis.

By another preferred embodiment of the present invention it is provided the liquid supply measuring apparatus, further includes a valve installed in the housing, wherein the controller, according to a predetermined criteria, operates the valve.

By another preferred embodiment of the present invention it is provided the liquid supply measuring apparatus, wherein the controller is programmable and operative—according to a predetermined criteria—to perform tasks including opening and closing valves, transmitting measured information and controlling other means.

By another preferred embodiment of the present invention it is provided the liquid supply measuring apparatus, wherein the controller further includes a transceiver, this transceiver enables the controller to transmit and receive information, enables the controller to command other controllers or to be commanded by other controllers and enables remote programming of this controller.

By another preferred embodiment of the present invention it is provided the liquid supply measuring apparatus, further includes an electrical power storage, wherein the generator can charge the electrical power storage. This power storage can be a chargeable battery, a capacitor or both.

By another preferred embodiment of the present invention it is provided the liquid supply measuring apparatus, wherein the generator is integrated with the turbine in a way that the rotor of the generator is built in the turbine's blade and the stator of the generator is built in the housing.

By another preferred embodiment of the present invention it is provided the liquid supply measuring apparatus, wherein the generator is integrated with the turbine in a way that the rotor of the generator is built on the turbine's blade and the stator of the generator is built in the turbine's axis.

By another preferred embodiment of the present invention it is provided the liquid supply measuring apparatus, further includes a wall—made of a non magnetic material—separating between the turbine and the generator, wherein the drive coupling between the turbine and the generator is done by first and second magnets, wherein the first magnet is installed on the turbine axis near the wall and the first magnet drives the second magnet that is located on the other side of the wall—against the first magnet—and the second magnet is installed on the generator axis.

By another preferred embodiment of the present invention it is provided the liquid supply measuring apparatus, wherein the housing is separated into a first and second liquid passage and having a large turbine for high flow liquid and small turbine for low flow liquid—both are connected to generators—wherein the large turbine is located in the first passage and the small turbine is located in the second passage and wherein the first passage has a valve that enables or disables liquid to pass through the passage according to a predetermined criteria and wherein the criteria can be, inter alia, pressure differences or a command from the controller. By another preferred embodiment of the present invention it is provided the liquid supply measuring apparatus, wherein the valve is closed in a low flow of liquid through the apparatus, and is opened when the flow is rising over a predetermined threshold.

According to another aspect of the present invention, it is provided a liquid, or any other flowing material, supply measuring apparatus comprising:
- a housing to be serially installed to a liquid pipe in a way that the supplying liquid passes through the housing;
- a turbine, the turbine is installed inside the housing, wherein the turbine is spin by the passing liquid;
- a multi polar magnet that is attached to said turbine, creating a rotate able assembly;
- a claw pole stator with a coil, wherein the assembly is rotating inward inducing a full wave AC electrical power in the coil;
- a diode bridge that rectified the AC electrical power into DC electrical power;
- a power storage means, capable to store the DC electrical power; and
- a controller, capable to calculate the supplied liquid in a way of integrating said DC or AC electrical power in a time sequence.

According to another aspect of the present invention, it is provided, a method for measuring a supplied liquid comprising:
    a passing the liquid through a turbine;
    a rotating a generator by the turbine; and
    integrating the power that is supplied by the generator during a time sequence.

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the figures.

DESCRIPTION OF THE PREFERRED EMBODIMENTS

Figure 1:
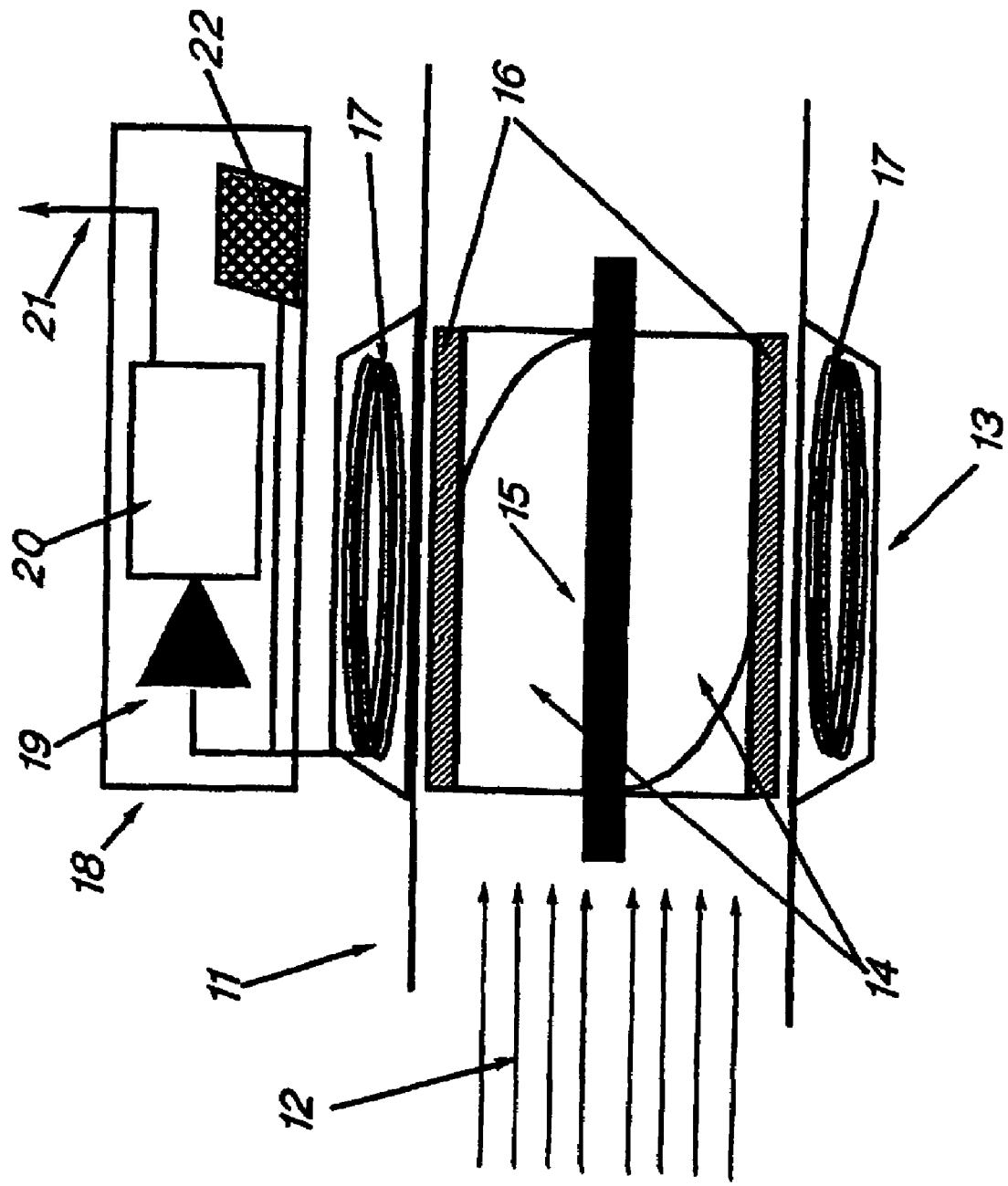
FIG. 1 illustrates a block diagram and a cross section of a preferred embodiment of the present invention.

The present invention is a liquid supply measuring apparatus. The main object of the present invention is it uses a turbine as a generator's rotor and the housing where the turbine is located as a generator's stator. While liquid is passing through the housing the turbine is spin and the generator that is made of the turbine and the housing creates electrical power. By integrating the electrical power during a time sequence the quantity of liquid supplied can be calculated. Moreover, the electrical power can be stored and used for the operating controller, for controlling valves and for performing other tasks. In a preferred embodiment the present invention is provided wherein the generator is independent and is driven by a coupling magnets, one on the turbine axis and the other on the generator axis.

The apparatus of the present invention includes a controller with communication capability that can be of any communication method or infrastructure. This communication capability can be used for remote controller programming and enables the controller to command other controllers and other garden systems.

The principles and operation of the liquid supply measuring apparatus according to the present invention may be better understood with reference to the drawing and the accompanying description.

Referring now to the drawing, FIG. 1 illustrates a block diagram and a cross section of a preferred embodiment of the present invention. Through the housing 11 the liquid 12 is passing and spins the turbine, which is comprised of turbine blades 14 capable to rotate on an axis 15 and magnets 16 that are installed on the edges of each turbine's blade. The blades 14 with the magnets 16 are the rotors of the generator while the stator 13 is built on the housing having coils 17 where the electrical power is created according to the spin of the blades 14 with the magnets 16. Any parameter of the created electrical power—voltage, current or frequency—can be used to calculate the liquid quantity that passes during a time sequence.

The electrical power is transferred to the controlling unit 18 that includes an integrator 19 to calculate the passed liquid, a controller 20 capable to store information and use it for controlling valves or controlling other systems via a communication channel 21. The controlling unit 18 is operated by power storage mean 22. This power storage mean 22 e.g., chargeable battery or capacitor, is charged by the power that is created by the apparatus itself.

Figure 2:
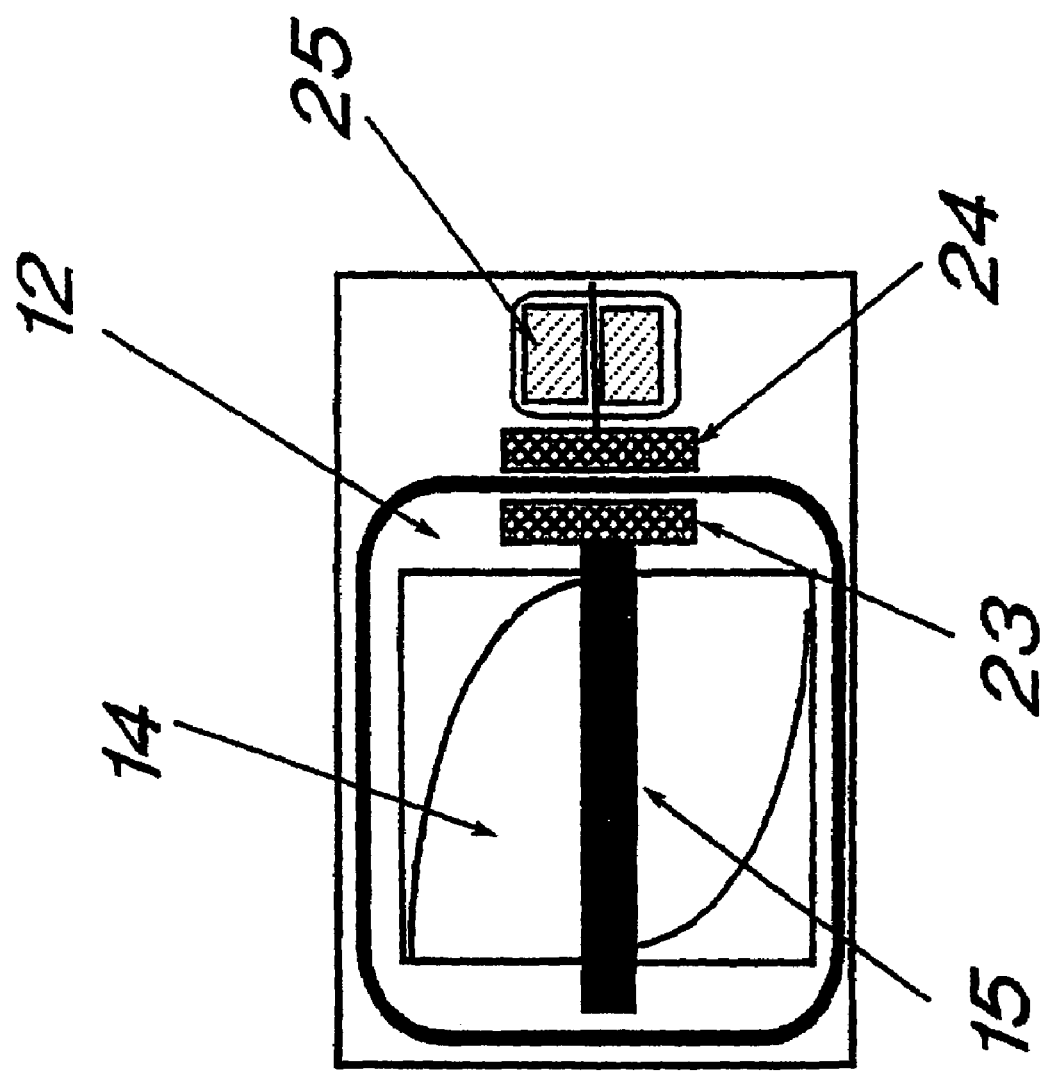
FIG. 2 illustrates a cross section of the embodiment with magnetic generator drive.

FIG. 2 illustrates a cross section of the embodiment with magnetic drive generator. The liquid 12 is passing and rotating the turbine blades 14 together with its axis 15. A first magnet 23 is installed on the axis 15 and rotates with it. The first magnet 23 drives the second magnet 24 that is located over the housing wall and the second magnet 24 rotates the generator 25.

Figure 3:
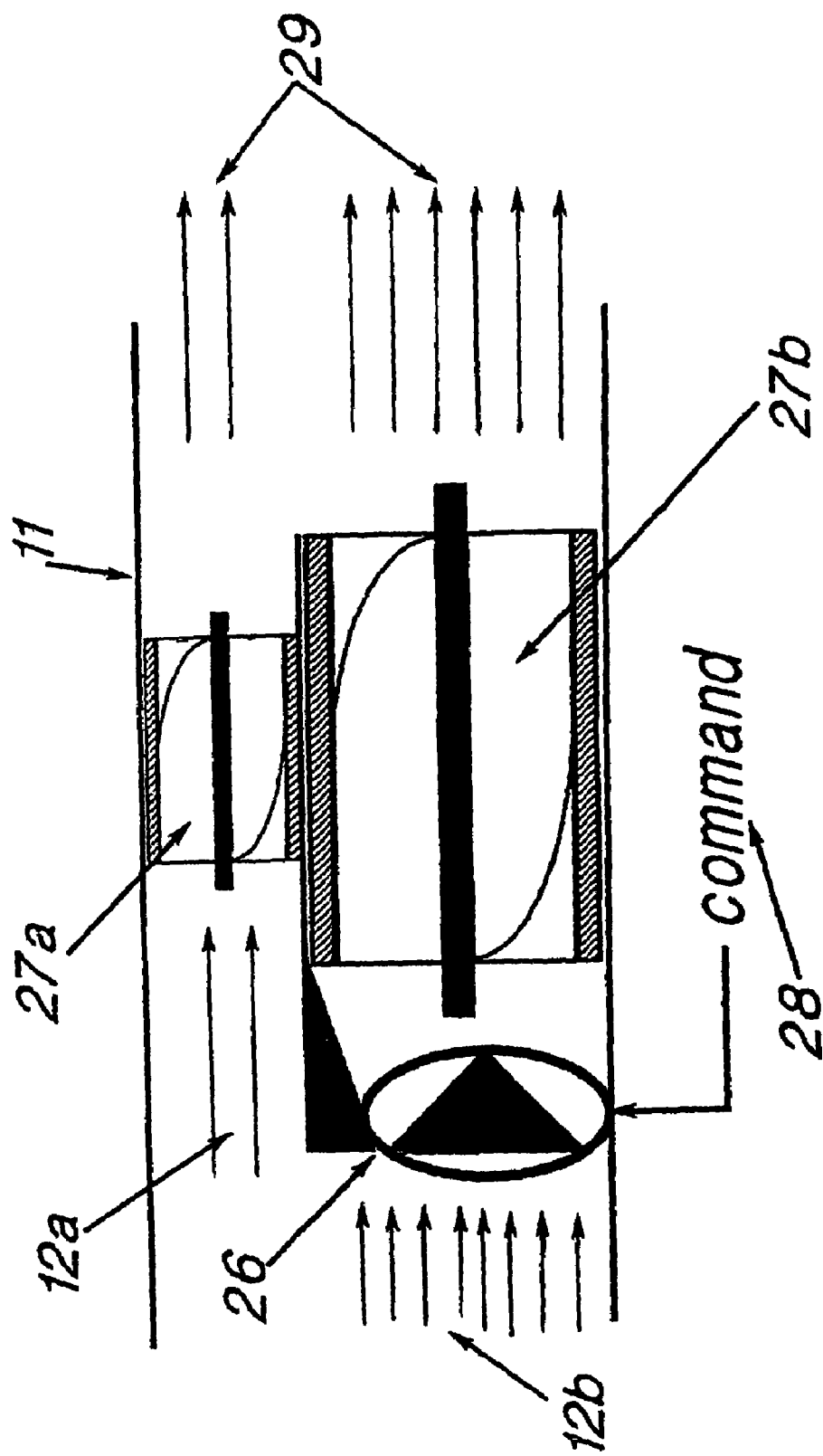
FIG. 3 illustrates a cross section of the embodiment with two passages; one for low flow and the other is opened in a high flow.

FIG. 3 illustrates a cross section of the embodiment with two passages; one for low flow and the other is opened in a high flow. This configuration is needed to accurate the measurements in cases of significant flow changes. To accurate the flow measurement, a small turbine is needed for the low flow and a large turbine is needed for the high flow. In such a configuration the liquid 12a & 12b enters to the housing 11. As long the pressure is low, which means slow flow, the valve 26 is closed and liquid 12a slowly flows through the small turbine 27a. When the pressure is increased over a predetermined threshold a command 28 from the controller (not shown) opens the valve 26 enabling liquid 12b to pass through the large turbine 27b. In case of reducing flow the command 28 will close the valve 26. The controller (not shown) calculates from both turbines the supplied liquid 29.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

What is claimed is:

1. A liquid supply measuring apparatus, comprising:
    a housing, having a liquid inlet and a liquid outlet, supporting a rotor including a shaft and a plurality of vanes attached thereto, said shaft extending in the housing in a direction allowing rotation of said vanes by liquid passing through the housing;
    a current generator associated with said rotor for producing electrical signals corresponding to the rotation of said rotor;
    a controller receiving said signals for processing and producing output signals, and
    a rechargeable power storage and supply unit connected to receive electrical signals from said current generator to charge said unit and to supply power to said controller required for its operation.

2. The apparatus as claimed in claim 1, wherein said current generator comprises magnets attached to free ends of at least some of said vanes and at least one electrical winding disposed on, or adjacent to, said housing.

3. The apparatus as claimed in claim 1, wherein an association between the rotor and said current generator is effected by magnetic transmission.

4. The apparatus as claimed in claim 1, further comprising an integrator for calculating the volume of liquid passing through said housing.

5. The apparatus as claimed in claim 1, wherein said housing is separated into a first and a second liquid passage of unequal cross-sectional areas for selectively, respectively, allowing high pressure and low pressure liquid flows to pass through one or both passages.

6. The apparatus as claimed in claim 1, wherein said controller comprises a transceiver for receiving and transmitting data and/or control signals.

* * * * *